United States Patent [19]

Robertson et al.

[11] Patent Number: 5,232,351
[45] Date of Patent: Aug. 3, 1993

[54] CENTRIFUGAL OIL PUMP BOOSTER

[75] Inventors: Kenneth D. Robertson, Jasper; Daniel J. Hadesh; Robert A. Lindstrom, both of Tecumseh, all of Mich.

[73] Assignee: Tecumseh Products Company, Tecumseh, Mich.

[21] Appl. No.: 912,878

[22] Filed: Jul. 13, 1992

[51] Int. Cl.⁵ .................... F04B 17/00; F01M 1/00
[52] U.S. Cl. .................... 417/368; 184/6.18
[58] Field of Search ............ 417/368; 184/6.16, 6.18, 184/31; 416/186 R

[56] References Cited

U.S. PATENT DOCUMENTS

| | | | |
|---|---|---|---|
| 2,500,751 | 3/1950 | Halfvarson | 230/208 |
| 3,295,753 | 1/1967 | Butts | 230/139 |
| 3,403,846 | 10/1968 | Parker | 230/206 |
| 3,572,978 | 3/1971 | Scheldorf | 417/372 |
| 3,664,461 | 5/1972 | Leffers et al. | 184/6.18 |
| 4,478,559 | 10/1984 | Andrione | 417/368 |
| 4,834,627 | 5/1989 | Gannaway | 184/6.16 |
| 5,007,808 | 4/1991 | Fraser, Jr. et al. | 417/368 |

*Primary Examiner*—Richard A. Bertsch
*Assistant Examiner*—Alfred Basichas
*Attorney, Agency, or Firm*—Baker & Daniels

[57] ABSTRACT

A compressor assembly including a crankshaft with an axial oil passageway therein. An oil pump booster is mounted on the crankshaft to increase the oil flow rate through the axial oil passage. The oil pump booster includes a counterweight and an enclosed channel extending in the radial direction communicating with the axial passageway of the crankshaft. During rotation of the compressor crankshaft, the radial oil channel is likewise rotated creating a centrifugal force or reduced pressure area to increase the oil flow through the axial passage.

12 Claims, 3 Drawing Sheets

CENTRIFUGAL OIL PUMP BOOSTER

BACKGROUND OF THE INVENTION

The present invention relates generally to a hermetic reciprocating compressor and, more particularly, to such a compressor having a lubrication system, wherein the rotation of an oil pump booster acts to increase the oil flow rate within the lubrication system.

The general prior art of hermetic compressors comprise a hermetically sealed housing having a compressor mechanism mounted therein. The compressor mechanism may include a crankcase or a cylinder block defining a compression chamber therein in which gaseous refrigerant is compressed and subsequently discharged. The pistons are reciprocated by an eccentric portion of a crankshaft rotating within a crankcase.

In prior art hermetic compressor assemblies, a lubricating system is disposed within the crankshaft. A tapered oil pickup tube is attached to one end of the crankshaft to spin within the oil in an oil sump. The tube rotation will impart a spinning motion to the oil within the tube, due to the viscous friction between the oil and the pickup tube, thereby pumping the oil up the axial oil passageway to other parts of the lubricating system.

One prior art compressor, as shown in U.S. Pat. No. 3,572,978, includes an axial oil passageway 21 disposed within the crankshaft having a radial oil passageway 29. This compressor includes a rotary pump to pump oil up into axial oil passageway 21.

Another prior art compressor, as shown in U.S. Pat. No. 2,500,751 includes an axial oil passageway 74 through the crankshaft to communicate oil to the top part of the compressor. Axial oil passageway 74 included intermediate ducts to help lubricate bearing surfaces.

A disadvantage of prior lubrication system designs is that at times the oil flow within a system is insufficient to adequately lubricate the bearings and other moving parts of the compressor.

Another disadvantage of prior lubrication designs is that oil escaping from the lubrication system may be mixed with compressed refrigerant by turbulence within the compressor thereby increasing the amount of entrained oil within the refrigerant and correspondingly reducing the amount of oil within the compressor, where it is needed. Oil suspended within the compressor refrigerant may reduce the refrigerant's ability to transfer heat.

SUMMARY OF THE INVENTION

The present invention overcomes the aforementioned problems associated with prior art compressors by providing a oil pump booster attached to the crankshaft thereby increasing the oil flow rate through the lubrication system. The oil pump booster may include a counterweight to counteract dynamic forces within the compressor.

Generally, the invention provides an oil pump booster attached to the top of the crankshaft. Within the booster is an enclosed channel oriented in a radial direction communicating with the axial oil passageway within the crankshaft. The oil pump booster may include an internal counterweight to help balance the dynamic forces of the compressor.

In one form of the invention, the oil pump booster includes an oil restrictor to slow the flow of oil through the lubrication system. This prevents excess oil from mixing with the refrigerant gases.

An advantage of the compressor of the present invention is that the oil flow rate through the lubrication system of the compressor is increased. This provides a larger quantity of oil to lubricate the compressor parts. An increase of the oil flow rate of between 100% to 150% is possible.

Another advantage of the compressor of the present invention is that of reducing entrained oil within the refrigeration fluid by reducing the spraying of oil within the compressor. By reducing the amount of oil mixed with the refrigerant, less oil is likely to leave the compressor.

Yet another advantage of the compressor of the present invention is that the oil pump booster may be made integral with the counterweight portion to provide the necessary balancing of the dynamic forces within the compressor.

The invention, in one form thereof, comprises a compressor including a hermetic housing containing a crankcase with a cylinder and reciprocating piston for compressing gaseous refrigerant. A drive means is located within the crankcase for reciprocating the piston, specifically a crankshaft rotatably received within the crankcase. The crankshaft includes an axial oil passage for transporting oil from the sump to the crankcase. An oil pumping mechanism communicates between the oil sump and the axial oil passage to pump oil through the axial oil passage. An oil pump booster is attached to the top section of the crankshaft to increase the flow of oil through the crankshaft by attaching an enclosed oil channel extending in radial direction into communication with the axial oil passageway. During rotation of the crankshaft, the radial oil channel within the oil pump booster is rotated creating a reduced pressure area to increase the oil flow through the crankshaft axial passage.

In accord with another aspect of the invention, an oil flow restrictor is disposed within the oil pump booster to retard and limit the oil flow through the axial oil passageway.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
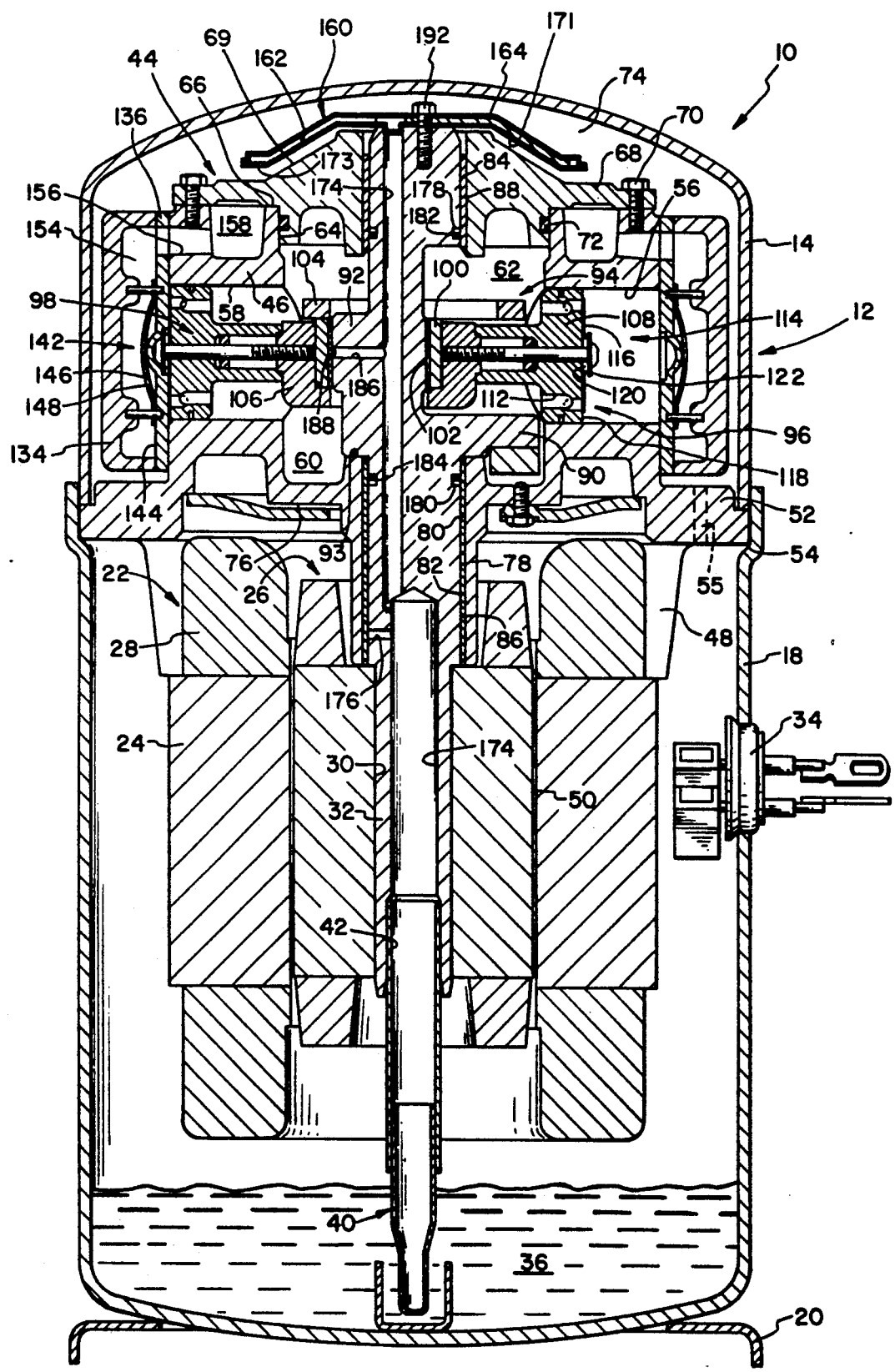
FIG. 1 is a longitudinal sectional view of a compressor incorporating the present invention.
Figure 2:
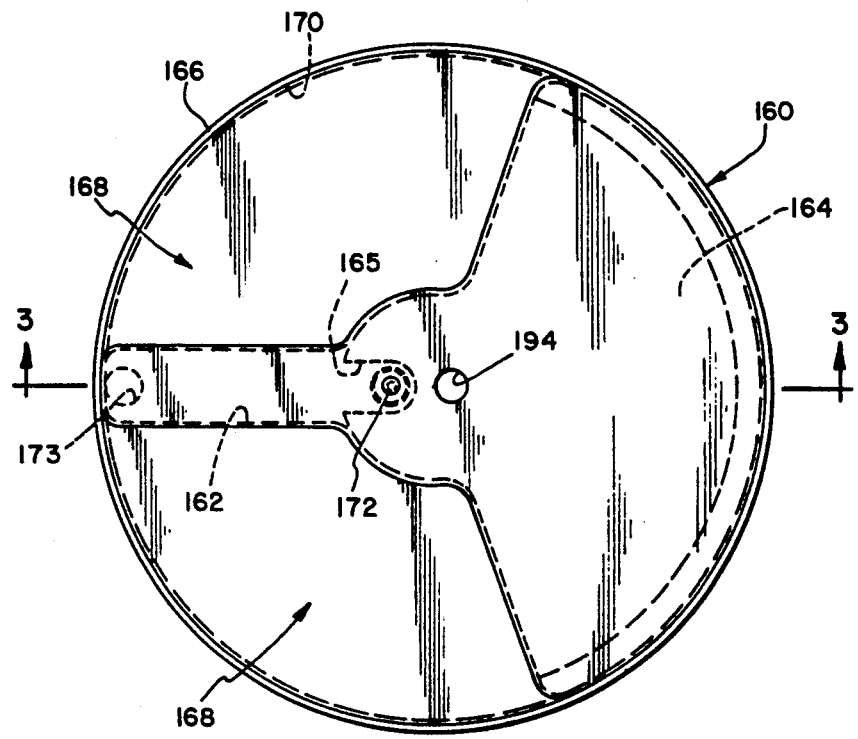
FIG. 2 is a top view of the oil pump booster of the present invention.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

In an exemplary embodiment of the invention as shown in the drawings, and in particular by referring to FIG. 1, a compressor assembly 10 is shown having a housing generally designated at 12. The housing has a top portion 14 and a bottom portion 18. The two housing portions are hermetically secured together as by welding or brazing. A mounting flange 20 is welded to the bottom portion 18 for mounting the compressor in a vertically upright position. Located within hermetically sealed housing 12 is a drive means such as an electric motor generally designated at 22 having a stator 24 and a rotor 26. The stator is provided with windings 28. Rotor 26 has a central aperture 30 provided therein into which is secured a crankshaft 32 by an interference fit. A terminal cluster 34 is provided in bottom portion 18 or housing 12 for connecting the compressor to a source of electric power.

Compressor assembly 10 also includes an oil sump 36 located in bottom portion 18. An oil pump mechanism such as a centrifugal oil pick-up tube 40 is press fit into a counterbore 42 in the end of crankshaft 32. Oil pick-up tube 40 is of conventional construction and includes a vertical paddle (not shown) enclosed therein.

Also enclosed within housing 12, in the embodiment shown in FIG. 1, is a scotch yoke compressor mechanism generally designated at 44. A complete description of a basic scotch yoke compressor design is given in U.S. Pat. No. 4,838,769 assigned to the assignee of the present invention and expressly incorporated by reference herein.

Compressor mechanism 44 comprises a crankcase or cylinder block 46 including a plurality of mounting lugs 48 to which motor stator 24 is attached such that there is an annular air gap 50 between stator 24 and rotor 26. Crankcase 46 also includes a circumferential mounting flange 52 axially supported within an annular ledge 54 in bottom portion 18 of the housing. The lower portion of crankcase 46 and mounting flange 52 serve to divide the interior of the housing 12 into an upper chamber in which the compressor mechanism 44 is mounted and a lower chamber in which motor 22 is disposed. A passage 55 extends through flange 52 to provide communication between the top and bottom ends of housing 12 for return of lubricating oil and equalization of discharge pressure within the entire housing interior.

Compressor mechanism 44, as illustrated in the preferred embodiment, takes the form of a reciprocating piston, scotch yoke compressor. More specifically, crankcase 46 includes four radially disposed cylinders, two of which are shown in FIG. 1 and designated as cylinder 56 and cylinder 58. The four radially disposed cylinders open into and communicate with a central suction cavity 60 defined by inside cylindrical wall 62 in crankcase 46. A relatively large pilot hole 64 is provided in a top surface 66 of crankcase 46. Various compressor components, including the crankshaft, are assembled through pilot hole 64. A top cover such as cage bearing 68 is mounted to the top surface of crankcase 46 by means of a plurality of bolts 70 extending through bearing 68 into top surface 66. When bearing 68 is assembled to crankcase 46, and 0-ring seal 72 isolates suction cavity 60 from a discharge pressure space 74 defined by the interior of housing 12. In the embodiment shown in FIG. 1, bearing 68 includes a cone-shaped top surface 69 that conforms in shape to the oil pump booster 160 of the present invention discussed herein.

Crankcase 46 further includes a bottom surface 76 and a bearing portion 78 extending therefrom. Retained within bearing portion 78, as by press fitting, is a sleeve bearing assembly comprising a pair of sleeve bearings 80 and 82. Two sleeve bearings are preferred rather than a single longer sleeve bearing to facilitate easy assembly into bearing portion 78. Likewise, a sleeve bearing 84 is provided in cage bearing 68, whereby sleeve bearings 80, 82 and 84 are in axial alignment. Sleeve bearings 80, 82 and 84 are manufactured from steelbacked bronze.

A sleeve bearing, as referred to herein, is defined as a generally cylindrical bearing surrounding and providing radial support to a cylindrical portion of a crankshaft, as opposed to a thrust bearing which provides axial support for the weight of the crankshaft and associated parts. A sleeve bearing, for example, may comprise a steel-backed bronze sleeve insertable into a crankcase, or a machined cylindrical surface made directly in the crankcase casting or another frame member.

Referring once again to crankshaft 32, there is provided thereon journal portions 86 and 88, wherein journal portion 86 is received within sleeve bearings 80 and 82, and journal portion 88 is received with sleeve bearing 84. Accordingly, crankshaft 32 is rotatably journalled in crankcase 46 and extends through a suction cavity 60. Crankshaft 32 includes a counterweight portion 90 and an eccentric portion 92 located opposite one another with respect to the central axis of rotation of crankshaft 32 to thereby counterbalance one another. The weight of crankshaft 32 and rotor 26 is supported on thrust surface 93 of crankcase 46.

Eccentric portion 92 is operably coupled by means of a scotch yoke mechanism 94 to a plurality of reciprocating piston assemblies corresponding to, and operably disposed within, the four radially disposed cylinders in crankcase 46. As illustrated in FIG. 1, piston assemblies 96 and 98, representative of four radially disposed piston assemblies operable in compressor assembly 10, are associated with cylinder bores 56 and 58, respectively.

Scotch yoke mechanism 94 comprises a slide block 100 including a cylindrical bore 102 in which eccentric portion 92 is journalled. Scotch yoke mechanism 94 also includes a pair of yoke members 104 and 106 which cooperate with slide block 100 to convert orbiting motion of eccentric portion 92 to reciprocating movement of the four radially disposed piston assemblies. For instance, FIG. 1 shows yoke member 106 coupled to piston assemblies 96 and 98 of the present invention, whereby when piston assembly 96 is at a bottom dead center position, piston assembly 98 will be at a top dead center position.

Referring once again to piston assemblies 96 and 98, each piston assembly comprises a piston member 108 able to reciprocate within a cylinder to compress gaseous refrigerant therein. Suction ports 112 extending through piston member 108 allows suction gas within suction cavity 60 to enter cylinder 56 on the compression side of piston 108.

A suction valve assembly 114 is also associated with each piston assembly and comprises a flat, disk-shaped suction valve 116 which in its closed position covers suction ports 112 on top surface 118 of piston member 108. Suction valve 116 opens and closes by virtue of its own inertia as piston assembly 96 reciprocates in cylinder 56. More specifically, suction valve 116 rides along a cylindrical guide member 120 and is limited in its travel to an open position by an annular valve retainer 122.

Compressed gas refrigerant within each cylinder is discharged through discharge ports in a valve plate. With reference to cylinder 58 in FIG. 1, a cylinder head 134 is mounted to crankcase 46 with a valve plate 136 interposed therebetween. A valve plate gasket (not shown) is provided between valve plate 136 and crankcase 46.

A discharge valve assembly 142 is situated on a top surface 144 of valve plate 136. Generally, compressed gas is discharged through valve plate 136 past an open discharge valve 146 that is limited in its travel by a discharge valve retainer 148.

Referring once again to cylinder head 134, a discharge space 154 is defined by the space between top surface 144 of valve plate 136 and the underside of cylinder head 134. Head 134 is mounted about its perimeter to crankcase 46 by a plurality of bolts (not shown). Discharge gas within discharge space 154 associated with each respective cylinder passes through a respective connecting passage 156, thereby providing communication between discharge space 154 and a top annular muffling chamber 158.

Compressor assembly 10 of FIG. 1 also includes a lubrication system associated with oil pick-up tube 40 previously described. Oil pick-up tube 40 acts as an oil pump to pump lubricating oil from sump 36 upwardly through an axial oil passageway 174 extending through crankshaft 32. A radial oil passageway 176 communicating with passageway 174 may be provided to initially supply oil to sleeve bearing 82. The disclosed lubrication system also includes annular grooves 178 and 180 formed in crankshaft 32 at locations along the crankshaft adjacent opposite ends of suction cavity 60 within sleeve bearings 80 and 84. Oil is delivered into annular grooves 178, 180 behind annular seals 182, 184, respectively retained therein. Seals 182, 184 prevent high pressure gas within discharge pressure space 74 in the housing from entering suction cavity 60 past sleeve bearings 84 and 80, 82 respectively. Also, oil delivered to annular grooves 178, 180 behind seals 182 and 184 lubricate the seals as well as the sleeve bearings.

Another feature of the disclosed lubrication system of compressor assembly 10 in FIG. 1, is the provision of a pair of radially extending oil ducts 186 from axial oil passageway to a corresponding pair of openings 188 on the outer cylindrical surface of eccentric portion 92.

Oil pump booster 160 of the present invention is shown specifically in FIGS. 2–6. Booster 106, including a radial oil passage 162, is attached to the top of crankshaft 32 so that radial passage 162 is in communication with crankshaft axial oil passage way 174. During compressor operation, radial passage 162 spins with crankshaft 32, causing a reduced pressure area at outlet 173 to pull oil up through axial oil passage 174.

In one embodiment, oil pump booster 160 is constructed for ease of assembly in a layered arrangement as shown in FIGS. 3 through 6. Alternatively, booster 160 could be manufactured in a one-piece construction.

Figure 3:
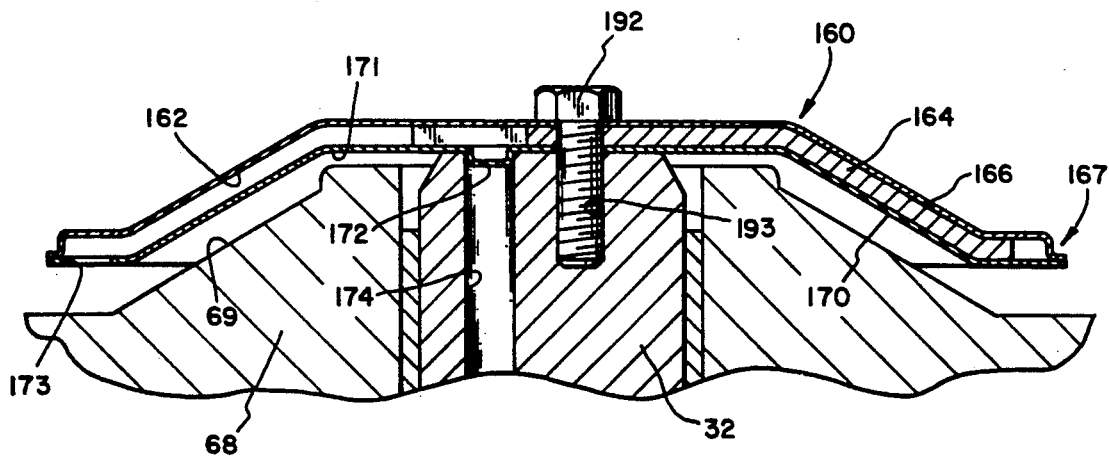
FIG. 3 is a sectional view of the oil pump booster of FIG. 2 taken along line 3—3 and viewed in the direction of the arrows.
Figure 4:
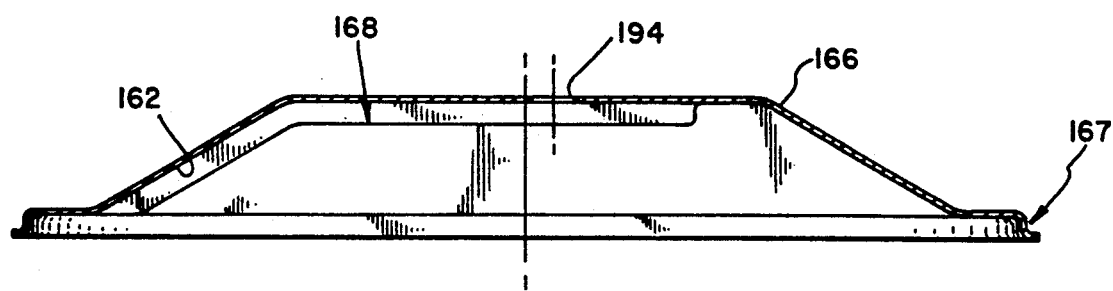
FIG. 4 is an sectional view of the top portion of the oil pump booster of the present invention.
Figure 5:
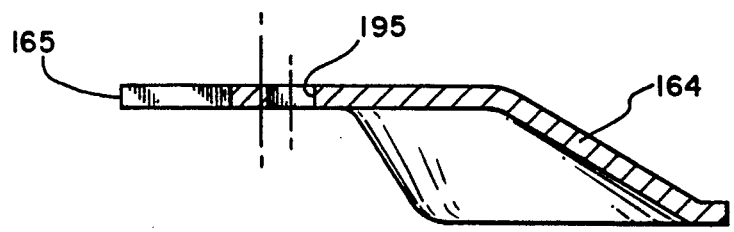
FIG. 5 is an sectional view of the counterweight portion of the oil pump booster.
Figure 6:
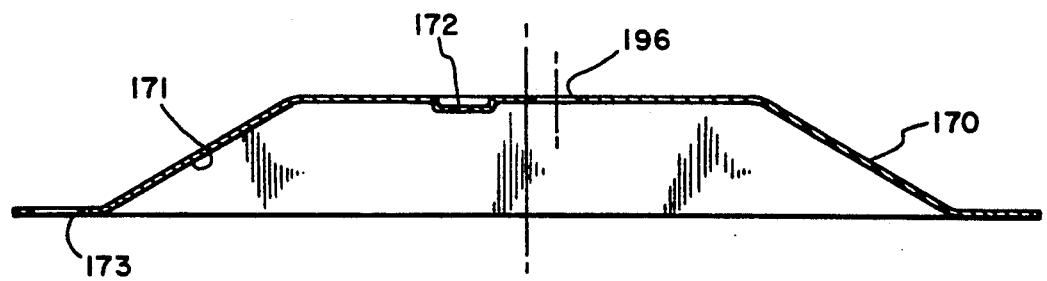
FIG. 6 is an sectional view of the bottom portion of the oil pump booster.

As shown in FIGS. 1 and 3, booster 160 includes a counterweight 164 disposed between a stamped steel booster top member 166 and booster bottom member 170, all of which are attached to crankshaft 32 by bolt 192 threaded into an off center bolt hole 193. Bolt 142 is inserted through openings 194, 195 and 196, in top member 166, counterweight 164, and bottom member 170, respectively.

Bottom member 170, preferably made from stamped sheet metal, shaped into a disk or dish shape, is attached directly to crankshaft 32. An opening or narrowed passageway 172 in bottom member 170 is directly over crankshaft axial oil passageway 174 to permit oil to communicate through booster 160. Bottom surface 171 of bottom member 170 substantially conforms in shape to bearing surface 69.

The shape of booster 160 and particularly bottom surface 171 conforms closely to top surface 69 of bearing 68. The conformance in shape reduces turbulence in the compressed gases within the compressor housing 12. Although a substantially cone shaped surface 69 and dish shaped bottom surface 171 are shown in FIGS. 1 and 3, other shapes may be used to reduce turbulence.

A wedge shaped counterweight 164 is attached between the top member 166 and bottom member 170 of booster 160. Counterweight 164 may contain an opening or slot 165 that aligns with axial oil passageway 174, to provide an outlet for oil pumped from sump 36. The specific size, shape and density of counterweight 164 is determined upon the amount of balancing force needed in the particular compressor system used as is known in the art.

Top booster member 166, preferably formed from sheet metal into a disk, plate, or dish shape, substantially the same shape as bottom member 170, is attached to counterweight 164 by bolt 192. The two members 168 and 170 of oil pump booster 160 may be soldered or brazed together if needed. Top member 166 includes a lip portion 167 that seals against bottom member 170. The placement of counterweight 164 between top booster member 166 partially fills a hollow space 168 into which oil may accumulate from crankshaft oil passage 174. This hollow space is transformed by the shape of top member 166, into an enclosed radial oil channel 162 extending in a radial direction.

To construct radial oil passageway 162, sections 168 of top member 166 are bent or formed to closely conform to bottom member 170 thereby forming a recess in the top member 166. Alternate equivalent methods may be used to create radial passageway 162 such as including a lightweight filler into sections 168 or brazing a tube to the underside of top booster member 166.

An oil exit hole 173 is located in bottom member 170 oriented to permit oil to escape from radial oil passageway 162 into the discharge pressure space 74 of the compressor.

In operation, oil pump booster 160 increases the flow of oil through the compressor lubrication system and particularly crankshaft axial oil passageway 174. During compressor operation, crankshaft 32 rotates causing the attached oil pump booster 160 to rotate. The refrigerant passing over the spinning radial passageway 162 and oil exit hole 172 creates a low pressure area at the outer radial end of passageway 162.

Since the radial oil passageway 162 is in communication with axial oil passageway 174 and thereby oil pickup 40 and oil sump 36, the differential pressure between the oil in axial passageway 174 and radial passageway 162 increases the oil flow entering oil pickup 40 and axial passageway 174 through exit hole 173. Also the centrifugal force of oil within booster 160 ejected during operation assists in pulling lubricant oil through the lubrication system.

The rotation of oil pump booster 160 pulls oil through the lubrication system and pushes the oil through radial passageway 162. Oil then exits through exit hole 173 in a direction toward crankcase 46 and cage bearing 68. By directing the exiting oil toward the compressor and away from compressor housing 12, entrained oil is reduced.

The oil pump booster 160 increases oil flow through the lubrication system by such an amount that the booster operation must be restricted or controlled. To accomplish this, opening 172 in bottom member 170 is constructed smaller than and disposed within passageway 174 to thereby restrict the amount of oil flowing into booster 160. Alternative ways of restricting oil flow may include reducing the size of exit hole 173, narrowing oil passageway 174, or the size of radial passageway 162.

An additional benefit to the oil booster 160 of the present invention is that it reduces turbulence in the top region of the compressor thereby reducing the amount of oil entrained with the refrigerant gases. Also, oil escaping from oil exit hole 173 is directed downwardly back toward cage bearing 68 which further helps to prevent oil spraying into the compressed refrigerant.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A compressor, comprising:
a hermetically sealed housing including an oil sump containing oil;
a crankcase within said housing, said crankcase including a cylinder formed therein and a reciprocating piston disposed within said cylinder to compress gaseous refrigerant;
a drive means for reciprocating said piston, said drive means including a crankshaft rotatably received in said crankcase, said crankshaft including an axial oil passage for transporting oil from said sump to said crankcase;
an oil pumping mechanism on a lower end of said crankshaft communicating between said sump and said axial oil passage to pump oil through said axial oil passage; and
an oil pump booster attached to an upper end of said crankshaft to increase the flow of oil through said crankshaft, said oil pump booster including a counterweight and a enclosed oil channel extending in a radial direction and terminating in a discharge opening, said channel in communication with said axial oil passage, whereby during rotation of said crankshaft, said radial oil channel is likewise rotated creating a reduced pressure at the discharge opening to increase oil flow through said axial oil passage.

2. The compressor of claim 1 in which said booster comprises a top member and bottom member connected together to form said oil channel, said counterweight disposed between said top and bottom members.

3. The compressor of claim 1 in which said booster further includes an oil flow restrictor to limit the oil flow through said axial oil passage.

4. The compressor of claim 3 in which said oil flow restrictor includes a narrowed passageway in said booster for slowing the oil flow through said axial oil passage.

5. The compressor of claim 1 in which said discharge opening opens toward said crankcase to reduce entrained oil.

6. The compressor of claim 1 in which said booster assembly comprises a top member and a bottom member attached together, said top member attached by a fastener to said bottom member and said crankshaft, said top and bottom member defining said radial enclosed oil channel.

7. The compressor of claim 6 in which said top member and said bottom member are dish shaped.

8. The compressor of claim 1 in which said compressor further includes an oil flow restrictor disposed within said crankshaft to limit the oil flow through said axial oil passage.

9. A compressor, comprising:
a hermetically sealed housing including an oil sump containing oil;
a crankcase within said housing, said crankcase including a cylinder formed therein and a reciprocating piston disposed within said cylinder to compress gaseous refrigerant;
drive means for reciprocating said piston, said drive means including a vertical crankshaft having a top end and a bottom end, said crankshaft rotatably received in said crankcase, said crankshaft bottom end submerged within said oil sump and including an axial oil passage for transporting oil from said sump to said crankshaft top end;
an oil pumping mechanism communicating between said sump and said axial oil passage to pump oil through said axial oil passage; and
an oil pump booster attached to said crankshaft top end to increase the flow of oil through said crankshaft, said oil pump booster including a counterweight and an enclosed oil channel extending in a radial direction and terminating in a discharge opening, said booster formed from two plate members juxtaposed and attached together to form said oil channel, said counterweight disposed between said plates, said channel in communication with said axial oil passage, whereby during rotation of said crankshaft said radial oil channel is likewise rotated, lowering the pressure at the top of the crankshaft thereby increasing oil flow through said axial oil passage.

10. The compressor of claim 9 in which said compressor further includes an oil flow restrictor disposed within said crankshaft to limit the oil flow through said axial oil passage.

11. The compressor of claim 9 in which said oil flow restrictor includes a narrowed passageway in said booster for slowing the oil flow through said axial oil passage.

12. The compressor of claim 9 in which said discharge opening opens toward said crankcase to reduce entrained oil.

* * * * *